United States Patent Office 3,600,482
Patented Aug. 17, 1971

3,600,482
METHOD OF FORMING A MAT OF
FIBROUS GELATIN
Ival O. Salyer and James L. Schwendeman, Dayton, Ohio, assignors to Monsanto Research Corporation, St. Louis, Mo.
No Drawing. Continuation-in-part of application Ser. No. 606,001, Dec. 30, 1966. This application Jan. 15, 1970, Ser. No. 3,232
Int. Cl. B29d 27/00
U.S. Cl. 264—50
4 Claims

ABSTRACT OF THE DISCLOSURE

A process for preparing light, porous mats of gelatin fibers which comprises producing a low-density foam from a 3–25% gelatin solution containing a surfactant, bringing said foam to a temperature at which gelation occurs, drying said foam, and crushing the membranes of said foam. The mats are useful packaging and insulating materials, filters and thermoplastic adhesives.

This is a continuation-in-part of our application Ser. No. 606,001 filed Dec. 30, 1966, and now abandoned.

BACKGROUND OF THE INVENTION

This invention pertains to a porous mat of gelatin fibers.

It is well established that fibers may be made from gelatin. As early as 1886, gelatin solutions were extruded through small orifices into fibers which were coagulated and tanned. (Robert Louis Wormell, New Fibres From Proteins, Butterworths Scientific Publications (London), 1954, page XIII). Likewise, the preparation of foamed gelatin is not new. In U.S. Pat. 2,000,042, Samuel E. Sheppard and James H. Hudson agitate a gelatin solution with air, chill it to set it, and thereafter dry it to yield a dried gelatin crepe. It may further be compressed to a permanently set sheet having an apparent dry density of approximately 0.14 g./cc. Other workers have reported the desirability of adding surface-active substances to gelatin solutions in making foams (e.g., S. A. Mikhanov and O. G. Tarakanov, Plasticheskie Massy, 1964 (8), 60–2, Chem. Abs. 61, 12217g). Apparently none of the prior art processes has yielded a mat of gelatin fibers such as that obtained by the present invention.

SUMMARY OF THE INVENTION

This invention relates to gelatin fibers and to a mat of interconnected gelatin fibers. More particularly, the invention provides a new and valuable process for preparing a mat of gelatin fibers, which comprises forcing a solution comprising gelatin, a surfactant and water, together with an inert gas through a foraminous member in order to produce a foam having a wet density of between about 0.003 and 0.02 gram per cubic centimeter, bringing said foam to a temperature at which gelation occurs, drying said foam until the membranes of said foam are in a pressure-crushable state, and crushing said membranes by compressing said foam so that the product is substantially free of closed cells.

The present process yields gelatin fibers without the necessity for mechanical extrusion through small orifices with attendant problems of plugging, erosion, etc., or for coagulation baths with their attendant problems of concentration, waste disposal, maintenance, etc. The gelatin fibers are produced in the form of useful mats having interconnected fibers bonded together in a semi-rigid structure. Such mats, unlike mats of unbonded fibers, are not subject to dislodgement of the fibers on shaking or exposure to a strong air stream.

Such mats have utility in a number of ways. They are a readily soluble form of gelatin and are useful for preparing gelatin solutions. They provide a novel form of a well-known food. They are easily softened by heat and are useful as thermoplastic adhesives. They are useful as filters for removing solids from gases. They may also be used for packaging or for thermal insulation. For example, relatively thick mats may be formed around fruit trees as a cocoon to protect from frost.

With chemical treatment, e.g., with crosslinking or tanning agents, well-known in the art, the fibrous mats may be rendered insoluble and resistant to moisture. Examples of such crosslinking agents are quebracho, chrome alum, dialdehyde starch, acrylic acid, lignosulfonates, gallic acid, formaldehyde, etc. The crosslinking step is readily incorporated in the process and may be executed before, simultaneously with, or after the formation of the gelatin fibers. Thus, a crosslinking agent may be added to the aqueous solution of gelatin and surfactant before or during the spraying step; or a separate solution of a crosslinking agent may be sprayed simultaneously with the gelatin-surfactant solution; or a crosslinking agent in vapor form or aerosol dispersion may be applied to the gelatin fibers during or after the drying step.

Other additives may be incorporated in the mats before or after the foaming step, e.g., dyes, humectants, softeners, plasticizers, flavoring agents, sweeteners, etc., provided they do not interfere with the foaming step.

The gelatin fibrous mats of the present invention are obtained by drying low-density gelatin foams. In order that fibers of suitable thickness may be obtained, the wet foam density is desirably in the range 0.0005 to 0.05 gram per cubic centimeter, preferably between about 0.003 to 0.02 g./cc. To prepare such low-density foams it is not sufficient to merely aerate a gelatin solution as by means of a mechanical stirrer. Even with the addition of surface-active substances, such a technique rarely yields foams of wet density less than 0.3 g./cc. We have found, however, that the desired low-density foams are readily and conveniently prepared by use of foam generators such as have found wide application in fire fighting. By suitable adjustment they will produce foams having an expansion ratio of up to 1000 volumes of foam for each volume of liquid.

The foraminous member of such foam generators consists of a sheet of material, e.g. cloth fabric or thin metal, which is full of holes. In the case of the fabric they may be formed by a loose weave of the material; in the case of the metal by perforating. The number and size of holes determine the number and size of the bubbles and resulting cells formed. These are also related to the expansion factor which is desirably in the range of 50–1000 to produce wet density foam in the desired range of 0.003 to 0.02 g./cc. In this density range the cell membrane thickness is such that the dry membranes are readily crushed without breaking a significant number of the interconnecting struts.

The low-density gelatin foams are generally closed cell structures consisting of bubbles of dispersed gas enclosed in and separated by membranes of gelatin. In an idealized representation the cells approach the geometric configuration of dodecahedra. At the common edges of the membranes are struts which are considerably thicker than the membranes. When the foam is dried to a state in which the membranes are crushable, by loss of most of the water, the foam can be crushed to break the relatively thin membranes without fracturing the struts. In this way a network of connecting gelatin fibers is produced from a foam. The thickness and length of the fibers are related to the density of the foam. With foams of wet density greater than about 0.3 g./cc. for example, the dried foam consists of closed cells with relatively thick membranes as compared with the open-celled fibrous mats of this invention.

DESCRIPTION OF THE PREFERRED EMBODIMENT

The process of this invention comprises (a) producing a low-density gelatin foam, (b) bringing said foam to a temperature at which gelation occurs, (c) drying said foam, and (d) crushing the membranes of said foam in order to form a mat of gelatin fibers.

Gelatin is the product obtained by selective hydrolysis of collagen, a constituent of the connective tissue of animal skins and bones. It occurs in crude form in animal glue. It is characterized by its ability to form a gel in equeous mediums at temperatures below 20–40° C. Solutions of gelatin are readily formed by swelling the dry particles in cold water and thereafter warming above 40° C. The gelation of a solution of gelatin is accomplished by bringing the solution to a temperature at which gelation occurs, e.g., below 20–40° C., and maintaining it at or below this temperature for a sufficient time. (John D. Ferry, Protein Gels, Advances in Protein Chemistry, Volume IV, edited by M. L. Anson and J. T. Edsall, Academic Press, New York, 1948, page 20). Both the temperature and time are dependent upon the concentration of the solution, the presence of additives, the pH of the solution, the history of the gelatin, the molecular weight distribution of the gelatin, etc. For a given solution of gelatin, the temperature of gelatin is readily determinable by experimentation.

In the formation of low-density gelatin foam, a solution of gelatin and a surfactant in water is prepared. The concentration of gelatin is preferably within the range of 3 to 25% by weight of the total solution. The upper limit of the concentration is largely determined by the viscosity of the gelatin solution, as to whether it can be suitably handled in the form-forming equipment. Concentrations of less than 3% may be employed but the fibers obtained therefrom tend to be thin, spidery, and weak.

The concentration of surfactant is preferably within the range of 0.005 to 0.2% by weight of the total solution. Either a nonionic or an anionic type surfactant may be used, but an anionic one of the sulfate or sulfonate type is preferred. Generally, nonanionic or anionic surfactants are preferred to cationic surfactants. Examples of nonionic surfactants are alkanolamides. Examples of anionic surfactants are sulfates and sulfonates. These and additional examples may be found in the Detergents and Emulsifiers Annual, (1966), John W. McCutcheon, Inc., Morristown, N.J.

To prevent bacterial decomposition of either the gelatin or the surfactant, small amounts of germicides (e.g. phenol, quaternary ammonium salts, etc.) may be added to the solution.

The warm solution of gelatin and surfactant is foamed with a gas to yield a low-density foam having a wet density in the range 0.0005 to 0.05 g./cc. preferably between about 0.003 and 0.02 g./cc. The preferred method for producing such foam is by using a high expansion foam generator. Such generators are well-known in the art, e.g. Nagy, J., Murphy, E. M., and Mitchell, D. W., "Controlling Mine Fires With High-Expansion Foam," U.S. Dept. of the Interior, Bureau of Mines, 1960; and U.S. Pat. 3,241,617 issued Mar. 22, 1966 to W. B. Jamison.

The device consists of two basic parts: the foam solution cylinder and the foam generator. The foam solution cylinder has appropriate valves provided for filling and pressurizing the system by air or gas pressure so that the foam solution may be discharged through a pipe or hose into a spray nozzle in the foam generator. The foam generator utilizes, besides the spray nozzle, a foam-forming foraminous member, specifically an open-structured fabric net, and a fan. The spray nozzle delivers the liquid gelatin solution in a full cone spray pattern against the net. The net is held taut by a light spring hooked through the center of the fabric circle which pulls it into a cone. Typical fabric for the net is double knit polyester fiber Swiss or French piqué with approximately 30–35 holes per square inch. The fan on the foam generator is directed by means of a housing toward the foam-forming net. The fan is provided with an air control gate for air quantity regulation. The foam is discharged from the down-stream side of the net.

In operation, the gelatin-surfactant solution is charged to the foam solution cylinder, the valve in the discharge line is closed, and the system is pressurized. The fan is started, and the discharge line valve slowly opened until foam forms in a continuous stream. The fan air control gate is adjusted to control the amount of air and, thereby, the density of the foam.

The foam may be collected in a container or on a tray or on a substrate or even on a moving belt. In order that the gelatin may "gel," the foam is cooled below the gelation temperature, usually below 30° C. The water is then removed, e.g., by drying under ambient conditions, by evacuation, by displacement by other low-boiling liquids, etc. thereby converting the wet gelatin foam into a dry gelatin foam having a considerably reduced water content. It is not necessary to remove all of the water from the gelatin but only as much as will leave the cell membranes in a crushable state. Thus it is generally satisfactory to dry the foam under ambient conditions of, say, less than 60% relative humidity. In the early stages of drying the temperature is necessarily below the gelation temperature, e.g. below about 30° C. As the water-content is reduced, the drying temperature may be raised so long as the gelatin-water composition is not "melted" or softened.

Finally, the cell membranes are broken to form an open structure of interconnected gelatin fibers. A convenient method is by crushing the membranes by gentle compression of the dry foam to, say, about 50% of the original thickness; or the foam may be compressed under greater pressure, e.g. 50 to 100 lbs./in.$^2$. Other methods of breaking the membranes may be employed, including rapid evacuation of the entrapped gases from the closed cells or preferential dissolution of the thin membranes by a relatively slow-acting solvent. Whatever process is used, compression being preferred, it is desired that the membranes be opened thereby leaving an open structure.

To render the product less susceptible to deterioration by moisture, it may be simply exposed to formaldehyde vapors for several hours.

The invention is further illustrated by, but not limited to, the following examples.

EXAMPLE 1

This example illustrates the use of a 10% by weight gelatin solution.

To 100 g. of gelatin (e.g. Swift's No. 710) was added 450 g. of water and the mixture left standing for 30 minutes. Then 450 g. of water, heated to 60–80° C., was added and the mixture stirred for about 1 hour, with the temperature maintained at 50–70° C. To the resulting solution was added a surfactant comprising 15 ml. of a concentrate of ammonium ethoxylated lauryl sulfate containing about 2.1 g. active material in a mixture of water and butoxydiethylene glycol. As an example of such surfactant there may be used "Hi-Ex" Foam Concentrate described by Walter Kidde and Co., Inc., Belleville, N.J. in their brochure on Hi-Ex Foam No. P121–35M–12–64–MC. There was then added 0.5 g. of phenol as a preservative against microorganisms.

The above foam solution at 40–60° C. was then charged to a foam generator of the type described above. The solution was sprayed at a rate of 0.4 gallon per minute; the air flow was set at about 125 cubic feet per minute. The foam was collected on a tray or in a container. It cooled quickly to 30° C. or lower. Its wet density was about 0.005 g./cc. After the water had evaporated from the foam so that it was in equilibrium with ambient conditions, the foam was compressed to crush the membranes, leaving an open network of gelatin fibers having a dry density of about 0.0006 g./cc. When the fibrous mat was exposed to formaldehyde vapors for several hours, the product thereafter showed no deterioration in water even after being immersed therein for several days.

EXAMPLE 2

This example illustrates the use of a 5% by weight gelatin solution.

To 1425 g. of cold water was added 150 g. of gelatin (e.g. Swift's No. 610) and the mixture left standing for 30 minutes. Then 1425 g. of water, heated to about 70° C., was added and the mixture gently agitated for about 1 hour. To the resulting solution was added 45 ml. of the surfactant of Example 1. There was also added 0.15 g. of sodium pentachlorophenate as a preservative.

The above solution was charged to the foam generator of Example 1 at 40–60° C. The solution was sprayed at varying flow rates as shown in the table below; the air flow was set at about 200 cubic feet per minute. The resulting foam was collected in cardboard boxes and dried at ambient conditions for about 9 days.

| Run: | Solution flow rate, cc./min. | Wet density of foam, g./cc. | Dry density of foam, g./cc. |
|---|---|---|---|
| A | 5,400 | 0.0149 | 0.0034 |
| B | 3,700 | 0.0101 | 0.0008 |
| C | 1,800 | 0.005 | 0.0005 |

The dry foams, A, B and C were compressed to break the cell membranes, leaving an interconnected mat of gelatin fibers having resilience.

The mat of fibers obtained from foam A was further compressed to a dry density of about 0.012 g./cc. It consisted of a mat in which substantially all of the fibers were interconnected and therefore not susceptible to dislodgement by severe shaking.

EXAMPLE 3

This example illustrates the use of a 3% by weight gelatin solution.

To 1455 g. of cold water was added 90 g. of gelatin (e.g. Swift's No. 610) and the mixture left standing for 30 minutes. Then 1455 g. of water, heated to about 70° C., was added and the mixture gently agitated for about 1 hour. To the resulting solution was added 45 ml. of the surfactant of Example 1. There was also added 0.09 g. of sodium pentachlorophenate as a preservative.

The solution was sprayed with a foam generator as in Example 1, at the flow rates shown in the table below. The foam was collected in cardboard boxes and dried at ambient conditions for about 7–14 days.

| Run: | Solution flow rate, cc./min. | Wet density of foam, g./cc. | Dry density of foam, g./cc. |
|---|---|---|---|
| D | 2,500 | 0.007 | 0.0009 |
| E | 1,400 | 0.0038 | 0.0001 |

The dry foams, D and E, were compressed to break the cell membranes, leaving a resilient open-structured mat of gelatin fibers.

It is to be understood that although the invention has been described with specific reference to particular embodiments thereof, it is not to be so limited since changes and alterations therein may be made which are within the full intended scope of this invention.

What we claim is:
1. A process of preparing a mat of gelatin fibers which comprises the steps of:
 (a) producing a foam having a wet density of between about 0.003 and 0.02 gram per cubic centimeter by forcing a solution comprising 3–25% by weight gelatin, a surfactant, and water, together with an inert gas, through a foraminous member;
 (b) bringing said foam to a temperature at which gelation occurs;
 (c) drying said foam until the membranes of said foam are in a pressure crushable state; and
 (d) compressing said dried foam so that the cell membranes are broken to produce a mat of gelatin fibers.

2. A process of claim 1, further limited in that the mat of gelation fibers are made difficultly soluble in water by reacting the gelatin fibers with a crosslinking agent selected from the group consisting of quebracho, chrome alum, dialdehyde starch, acrylic acid, lignosulfonates, gallic acid and formaldehyde.

3. A process as recited in claim 1, further limited in that the solution contains up to 1% surfactant by weight.

4. A process as recited in claim 1, further limited in that the inert gas is air.

References Cited

UNITED STATES PATENTS

| | | | |
|---|---|---|---|
| 243,685 | 7/1881 | Brooks | 260—117X |
| 1,045,234 | 11/1912 | Willis | 264—321X |
| 1,415,351 | 5/1922 | Howard | 252—3 |
| 2,000,042 | 3/1933 | Sheppard | 264—50X |
| 3,060,137 | 10/1962 | Gemeinhardt | 264—321X |
| 3,186,943 | 6/1965 | Barthauer | 252—3 |
| 3,362,832 | 1/1968 | Kalafatas | 260—117X |
| 3,429,768 | 2/1969 | Young | 264—50X |

OTHER REFERENCES

Nagy, John, "Controlling Mine Fires With High Expansion Foam," by J. Nagy, E. W. Murphy, and D. W. Mitchell [Washington] U.S. Dept. of the Interior, Bureau of Mines [1960] pp. 2, 3, 19–24.

JULIUS FROME, Primary Examiner

P. A. LEIPOLD, Assistant Examiner

U.S. Cl. X.R.

161—150; 260—2.5R, 117, 264—321